UNITED STATES PATENT OFFICE.

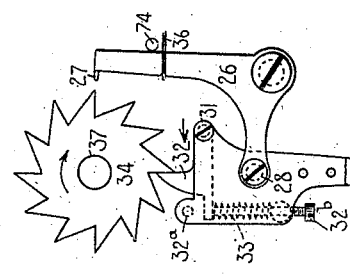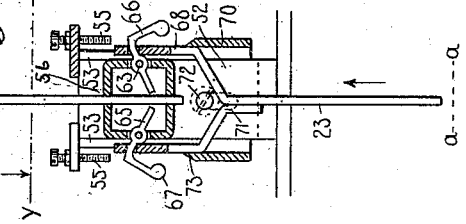
Fig. 4.
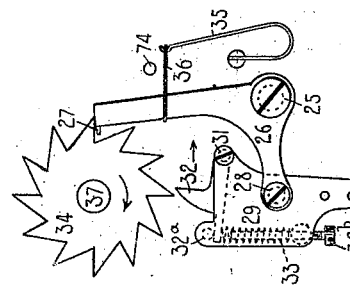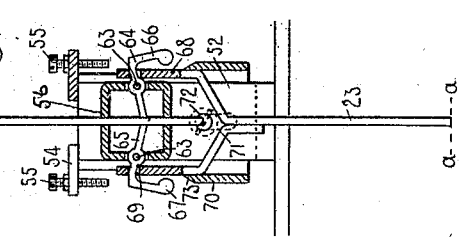
Fig. 3.
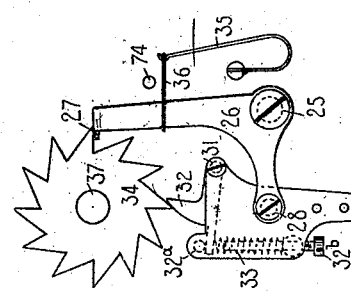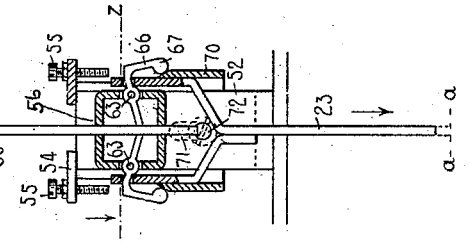
Fig. 7.
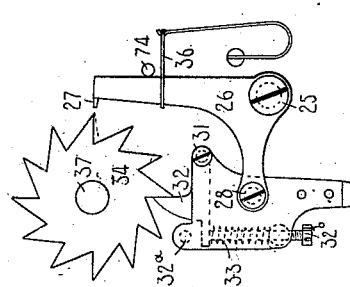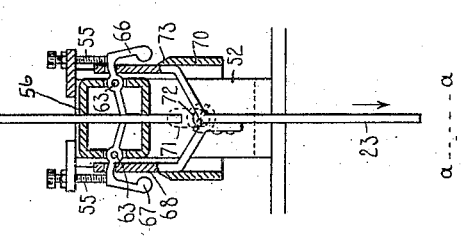
Fig. 6.
Fig. 5.

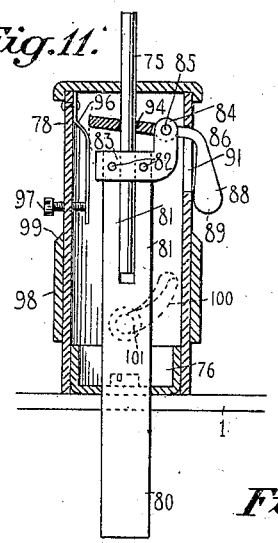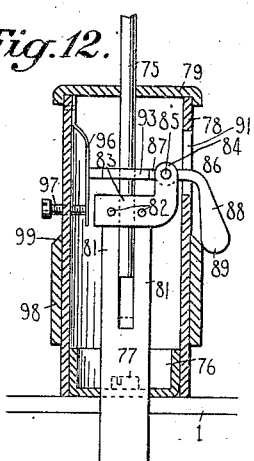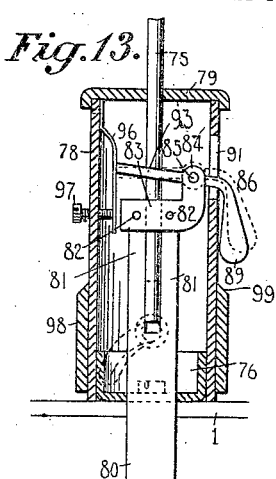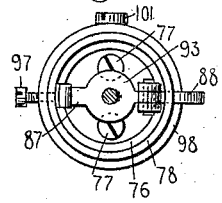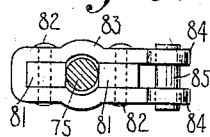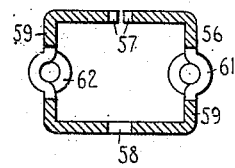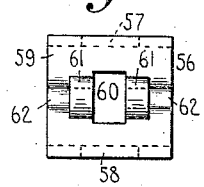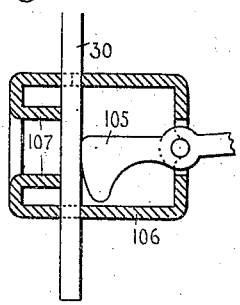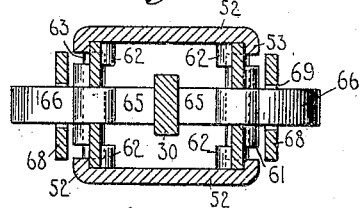

HERBERT H. STEELE, OF NEW YORK, N. Y., ASSIGNOR TO WYCKOFF, SEAMANS & BENEDICT, OF ILION, NEW YORK, A CORPORATION OF NEW YORK.

TYPE-WRITING MACHINE.

No. 929,258.　　　　Specification of Letters Patent.　　　Patented July 27, 1909.

Application filed July 13, 1904. Serial No. 216,341.

*To all whom it may concern:*

Be it known that I, HERBERT H. STEELE, citizen of the United States, and resident of the borough of Brooklyn, city of New York, in the county of Kings and State of New York, have invented certain new and useful Improvements in Type-Writing Machines, of which the following is a specification.

This invention relates to typewriting machines and more particularly to the carriage feeding mechanism of such machines.

One object of the invention is to provide for a quick release of the carriage after the impact of the type against the platen and immediately after the return movement of the finger key begins.

A second object is to provide means, in connection with the "ordinary" form of escapement mechanism, to release the carriage in letter space direction immediately after the stepping dog has separated from the tooth of the escapement wheel; in other words, to secure the effect of a "speed" or "reverse feed" escapement with a feed mechanism set as for the "ordinary" escapement.

A third object is to provide means to convert an "ordinary" escapement mechanism into a "reverse feed" escapement without altering the character or relative positions of the escapement members, that is, of either the dog member or members or the rack member or members.

Other objects will appear subsequently.

To these ends the invention consists of certain arrangements of parts, combinations of devices and features of construction to be hereinafter described and more particularly pointed out in the concluding claims.

Figure 1:
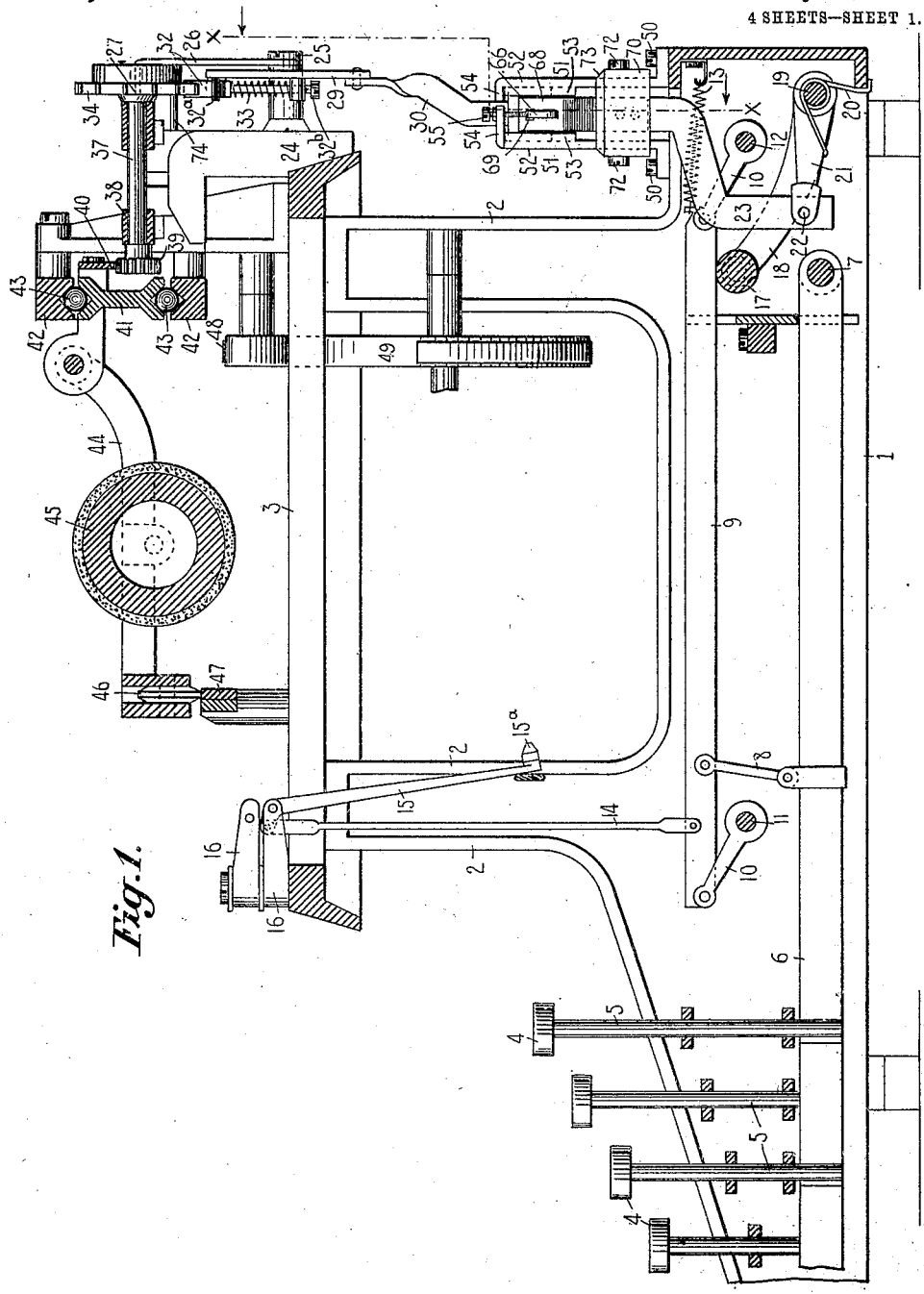
Figure 2:
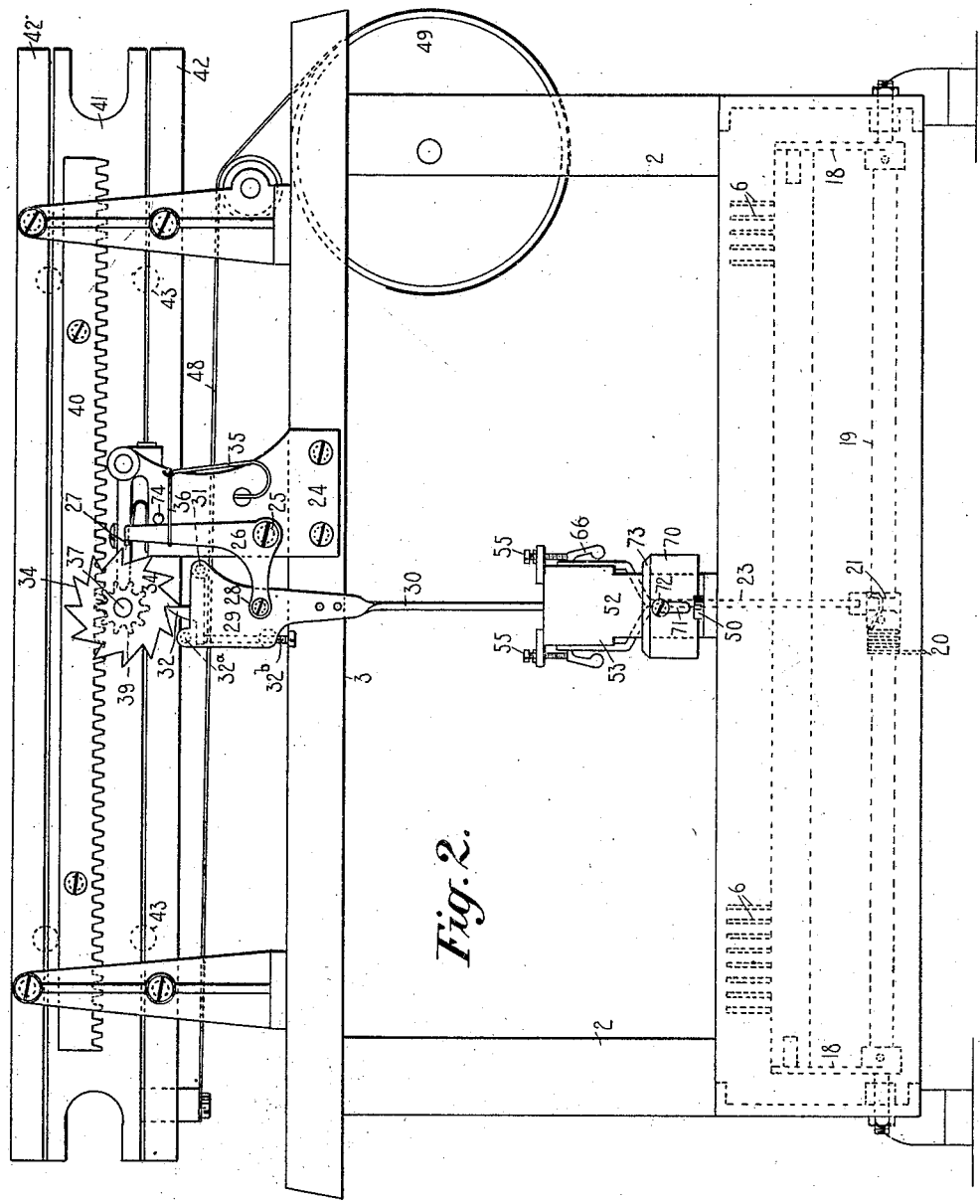

In the accompanying drawings, illustrating one general form of my invention and forming a part of this specification, Figure 1 is a central, vertical, longitudinal, sectional view of a typewriting machine, in which the invention is embodied, various parts of the machine being omitted and broken away for the sake of clearness. Fig. 2 is a rear elevation of the machine shown in Fig. 1. Fig. 3 is a rear view of a part of the carriage feeding mechanism taken on a plane represented by the line x x of Fig. 1, the mechanism being set to feed the carriage at the beginning of the upward movement of the finger or character key, and the parts being shown as they appear at the bottom of the downward stroke of any finger key or of the space bar. Fig. 4 is a view similar to Fig. 3 but with the parts shown as they appear after the upward movement of the finger key has begun. Fig. 5 is a view taken on the line y y of Fig. 4, the parts sectioned away in the latter figure being considered as restored. Fig. 6 is a view generally similar to Fig. 3 but with the mechanism set for "reverse" feed, the parts being shown in the normal position. Fig. 7 is a view similar to Fig. 6, the parts being shown as they appear when the key is nearing the bottom of the stroke and just before the release of the carriage for letter spacing. Fig. 8 is an enlarged sectional view taken on a plane represented by the line z z of Fig. 7, the parts sectioned away in the latter figure being considered as restored. Fig. 9 is an enlarged vertical sectional view of the clutch carrier as seen from the rear of the machine. Fig. 10 is an enlarged side elevation of the clutch carrier. Fig. 11 is an enlarged sectional rear elevation of a modified form of the clutch mechanism, the parts being shown in normal position and the mechanism being set for the "reverse feed" or "speed" escapement. Fig. 12 is a view similar to Fig. 11, the parts being shown as they appear just after the escapement has taken place. Fig. 13 is a view similar to Fig. 11, the mechanism being set to permit of the "ordinary" feed, the parts being shown as they appear at the bottom of the key stroke or depression. Fig. 14 is a top plan view of Fig. 11 with the cylindrical cover or cap removed. Fig. 15 is an enlarged top plan view of the clutch holder shown in Fig. 11. Fig. 16 is a fragmentary side elevation of the cylindrical casing shown in Figs. 11 to 14 inclusive. Fig. 17 is a fragmentary rear sectional view of another modification of the clutch devices. Fig. 18 is a fragmentary sectional rear elevation of a still further modification of the clutch devices.

Considering first Figs. 1 to 10 inclusive, the reference numeral 1 designates the base of the machine; 2, corner posts; and 3, the top plate or type ring. The finger keys 4 are suitably connected as by the key stems 5 to key levers 6, the latter extending from front to rear of the machine and being pivoted at their rear ends on a transverse fulcrum rod 7. Each key lever is connected by an upright link 8 to a horizontal draw-bar 9 which is supported at either end by one of a pair of obliquely arranged parallel links 10, the lower ends whereof are pivoted upon transverse fulcrum rods 11 and 12. Each draw bar is provided with a restoring spring 13 and has pivoted to it a connecting rod 14, which is pivotally secured at its upper end to one of a series of circularly arranged type bars 15 carrying a type 15ª journaled in hangers 16 secured to the type ring 3. Passing from side to side of the machine beneath and near the rear ends of the draw bars is a cylindrical rod 17 which controls the carriage feeding or letter spacing mechanism and is suitably secured at its ends in the front ends of a pair of upwardly and forwardly curving crank arms 18. The rod 17 is termed the "universal bar" and this term is commonly applied to devices having like functions to the rod 17 whatever the form or construction of such devices may be. The crank arms 18 are fixedly mounted on a transverse rock shaft 19 which is suitably supported in the sides of the base of the machine and is surrounded by a restoring spring 20. Fixed on the rock shaft 19 at about the center of its length is a forwardly extending crank arm 21 and pivoted to the latter at 22 is the lower end of the lower feed bar 23. Secured to the top plate 3 is a bracket 24 and suitably pivoted to the latter at 25 is an escapement bell crank 26, the upper end of the vertical arm whereof terminates in a rigid or holding dog 27. Pivotally secured to the end of the horizontal arm of the bell crank at 28 is a plate 29 which has suitably secured to its lower portion the upper end of the upper feed bar 30 and has pivoted in its upper portion at 31 a stepping or feeding dog 32, the movement of which is limited by stops 32ª and 32ᵇ. The feed dog is provided with a spring 33 which tends to swing the dog about its pivot in the direction of the arrow in Fig. 3 or in opposition to the direction of movement of the circular rack or escapement wheel 34, with a tooth of which the feed dog is normally engaged. Upon being disengaged from the teeth of the latter by the downward movement of the feed bar 30, the feed dog is moved by the spring 33 past the tooth with which it had been engaged. The upper end of the feed rod 30 is guided by the horizontal arm of the escapement bell crank 26 and upon the downward movement of said feed rod to withdraw the feed dog from the escapement wheel the holding dog 27 at the top of the vertical arm of the bell crank is caused to move into engagement with the escapement wheel. The bell crank 26 is provided with a returning spring 35 connected thereto by a link 36. The escapement wheel 34 is suitably secured on the rear end of a horizontal shaft 37 which is journaled in a bracket 38 and carries at its forward end a pinion 39 which meshes with a feed rack 40, the latter being mounted on a carriage truck 41. The carriage truck is provided with longitudinal ball grooves which are oppositely disposed to similar grooves formed in the stationary carriage rails 42, the two sets of grooves forming raceways for the anti-friction balls 43. Pivotally secured to the carriage truck 41 is a platen carrier 44 supporting a platen 45 and provided with a front roll 46 which runs upon a fixed track or way 47. A band 48 connects the carriage truck with a spring drum 49, which latter impels the carriage in the letter space direction and causes it to impart movement through the pinion 39 and shaft 37 to the escapement wheel 34. The foregoing devices are or may be of any suitable or known construction and are substantially such as are to be found in the typewriting machine known as the New Century Caligraph. It is, therefore, not deemed necessary to describe them with any greater degree of particularity.

Suitably secured as by headed screws 50 to the top of the rear of the base frame 1 of the machine are two oppositely disposed right-angled brackets or standards 51, the upper portion of the vertical arms 52 whereof are formed at either edge with flanges 53. The flanges of the forward bracket are bent rearwardly at right-angles to the vertical arm 52 with which they are connected, and the flanges of the rear bracket are bent forwardly at right angles to the vertical arm 52 with which they are connected, thus forming opposing tracks or ways, as may be seen most clearly in Fig. 8. As best appears in Fig. 5, the top of each standard is provided with a quadrant-like, horizontal ear or lug 54. The ends of these ears are perforated and the perforations are tapped to receive adjustable limiting screws 55. The track-like upper portions of the standards 51 serve to support and guide between them a clutch carrier 56. The carrier, which is shown in detail in Figs. 9 and 10, is preferably made of a single strip of metal which is bent or shaped into the form of a box having two open sides. The ends of the strip of metal approach each other at about the center of the top of the box-like carrier and are provided with notches which form an oblong opening 57 which registers or alines with a perforation 58 in the bottom of the carrier. The upper feed bar 30 is turned and bent forwardly so that its lower end passes down through the holes or openings 57 and 58 and is guided by the sides of said holes. The side walls 59 of the carrier 56 are provided with rectangular openings 60 and at either side of these openings the side walls are alternately raised at 61 and depressed at 62 to form circular bearings for short pivot pins 63. These pins serve as pivots for clutch members 64, which are mounted thereon. The clutch members are substantially right-angled in shape, the longer and horizontally disposed arms 65 entering the clutch carrier through the rectangular openings 60 and their inner ends abutting normally against opposite faces of the lower portion of the upper feed bar 30. The shorter arms 66 of the clutches are in normal position substantially vertical and are formed with rounded ends 67, the latter terminating about on a line with the bottom of the clutch carrier 56 and at some distance from the sides of the same.

A short distance above the pivot 22, the lower feed bar 23 is offset so as to come vertically beneath the clutch carrier, as is best seen in Fig. 1. The upper end of the lower feed bar is bifurcated, the two arms 68 of the bifurcated portion being bent sidewise to loosely embrace the sides of the clutch carrier and the tops of the arms terminating somewhat below the top surface of the clutch carrier. The arms 68 are perforated at 69 to permit of the passage through them of the arms 65 of the clutches. The size of the openings or perforations 69 is such as to permit of some little relative movement or vertical play between the clutch members and the feed bar 30. In other words, the feed bar can move a short distance up or down before the tops or bottoms of the openings 69 contact with the clutch arms 65. A sleeve 70 surrounds the standards 51 and the arms 68. The front and rear walls of the sleeve are formed with vertical slots 71 through which pass the stems of headed securing screws 72, which are screwed into tapped holes in the arms 52 of the standards. This construction permits the sleeve to be adjusted in various positions vertically of the standard arms 52. The upper edge of the sleeve 70 is formed with a bevel 73.

The operation of the devices hereinbefore described is as follows:—Considering first Figs. 1 to 5 inclusive, it will be noted that in these figures the sleeve 70 is adjusted in substantially its lowest position. When one of the finger or character keys 4 is adequately depressed, it lowers the key lever 6, and through the link 8, draw-bar 9 and connecting rod 14 causes the typebar 15 to be swung about its pivot from normal position, bringing the type 15ª to the printing point against the under side of the platen 45. It is deemed unnecessary to further describe the printing devices. The draw bar 9 in its downward movement depresses the universal bar 17, and the latter through the crank arms 18 vibrates the rock shaft 19, which in turn causes a downward movement of the forwardly extending crank arm 21 which is fixedly secured on said rock shaft. The downward movement of the crank arm 21 causes the lower feed bar 23, which is pivoted to said crank arm at 22, to be depressed. The arms 68 of the lower feed bar acting, through the tops of the holes 69, against the outer ends of the longer clutch arms 65, force their ends to clutch or grip tightly the lower end of the upper feed bar 30, causing the latter to participate in the downward movement of the lower feed bar 23. The downward movement of the upper feed bar 30 lowers the working face of the feed dog 32 out of contact with the working face of the tooth of the escapement wheel 34 with which it is engaged, and permits it under the influence of its spring 33 to be swung about its pivot 31 in the direction of the arrow in Fig. 3 to a position where it will contact with the next succeeding tooth of the escapement wheel. At the same time the holding dog 27 is swung into the path of the teeth of the escapement wheel, preventing the rotation of the latter at the lower limit of movement of the feed bar 23, which is represented by the dotted line a—a (Figs. 3, 4, 6 and 7). The parts will then be in the position shown in Fig. 3. If now the finger key be released, the universal bar starts on the return or latter half of its movement and the lower feed bar 23 will start to move upward under the influence of the restoring spring 20. The construction of the clutch carrier 56 is such that the spring of its side walls 59 develops sufficient friction between the said side walls and the flanges 53 of the standard arms to hold the clutch carrier motionless between the arms 52 of the standards at the beginning of the return stroke. As soon, however, as the bottoms of the perforations 69, contacting with the under side of the outer ends of the longer clutch arms 65, cause the arms 68 to actuate the clutch members, the inner ends of the longer clutch arms will be swung downward about their pivots, releasing the end of the upper feed bar 30 (as seen in Fig. 4). The release of the feed bar 30 permits the holding dog 27, under the influence of the spring 35, to be swung out of the path of the teeth of the escapement wheel and back against a limiting stop 74 fixed to the bracket 34, while at the same time the feed dog 32 moves up into the path of the teeth. The carriage, under the influence of the spring drum 49 will be thereupon drawn in printing direction, causing the escapement wheel 34 to be rotated in the direction of the arrow in Fig. 4, until the next tooth, contacting with the feed dog 32 forces the latter backward against its spring 33 until it reaches its normal position against its limiting stop 32ᵇ. The arrest of the feed dog brings the carriage to a stop after it has moved a single letter space, which movement it will be noted has taken place at the very beginning of the upward movement of the finger key. After the disconnection of the upper and lower feed bars, the latter bar continues its upward movement, swinging the inner ends of longer clutch arms downward until they contact with the bottom of the clutch carrier, after which the latter participates in the upward movement until normal position is reached. Just before this point is attained the tops of the outer ends of the longer arms 65 of the clutch members contact with the ends of the limiting screws 55 and the inner ends of the clutch members are swung upward about their pivots until they again grip or clutch the lower portion of the upper feed bar. The clutch members, their limiting stops and the feed bars will now be in the position shown in Fig. 6.

The mechanism as hitherto considered has been adjusted for feeding the carriage in the "ordinary" manner, as it is commonly termed, that is for holding the carriage until the key stroke or depression has been completed and allowing the carriage to move in letter space direction some time during the upward movement of the key. The play between the clutch members and the arms 68 is so limited that the upward movement of the various parts of the type action has hardly more than begun before the dog members of the escapement are released, thus permitting the carriage to feed. The feeding movement takes place at the most advantageous instant in the up-stroke of the key, no time being wasted and the parts being permitted to return to normal position as soon as possible before the beginning of the next key stroke and after the imprint of the type.

Considering now more particularly Figs. 6 and 7, it will be noted that in these figures the sleeve or collar 70 has been adjusted in working position, an operation which is accomplished by loosening the securing screws 72, raising the sleeve to the desired height and afterward tightening the screws to hold the sleeve in position. The mechanism is now adjusted for giving the "reverse feed" or "speed" escapement, that is, for freeing the carriage from the control of the escapement members, so that it may feed in a letter space direction, during the downward stroke or depression of the finger key. The normal positions of the parts when thus set for the "reverse feed" is best shown in Fig. 6. As the finger key is depressed the downward movement of the parts brings the rounded ends 67 of the shorter arms 66 into contact with the beveled edge 73 of the sleeve 70. Further depression of the finger key causes the beveled edge of the sleeve to cam the rounded ends of the shorter clutch arms outwardly, the rounded ends as they move downwardly riding on the face of the sleeve. As the rounded ends are cammed outwardly, the inner ends of the longer arms 65 of the clutch members are swung downwardly about their pivots 63, freeing the lower end of the upper feed bar (which has meanwhile pulled the dog members into substantially the position shown in Fig. 7), and thereby permitting the dog members to return to normal position and allowing the carriage to feed one tooth of the escapement wheel in letter space direction before the key has been fully depressed. After the upper and lower feed bars have been disconnected, the latter, under the influence of the finger key, continues its downward movement, carrying with it the clutch carrier and the clutch members to the bottom of the stroke and thereafter moving upwardly, carrying with it the clutch carrier and the clutch members, the rounded ends 67 riding part of the time on the face of the sleeve 70. Just before normal position is reached in the course of the upward movement of the parts, the tops of the outer portions of the longer arms of the clutch members contact with the ends of the limiting screws 55. Further upward movement swings the inner ends of the longer arms or grippers into gripping position against the feed bar 30, so that when the parts reach the limit of their upward movement they are again in the position shown in Fig. 6.

It will be noted that the sleeve 70 may be adjusted to cause the feed bar 30 to be freed and the carriage to be fed a single letter space at any point of the downward movement of the finger key, it being only necessary that this release of the feed bar 30 shall take place after the latter has moved downward far enough to free the tip of the feed dog 32 from contact with the working face of the tooth of the escapement wheel. It is possible, therefore, to adjust the parts so that any desired speed of escapement within practical limits may be attained.

The clutch mechanism hitherto described comprises two clutching or gripping members.

In Figs. 11 to 16 inclusive, I have illustrated another construction of clutch embodying a single gripping member. This modified form of clutch may be employed instead of the form hereinbefore described where the upper feed rod, as indicated by the numeral 75, is cylindrical in form instead of being rectangular in cross section as is the upper feed bar 30 illustrated in Figs. 1 to 10. When this style of clutch is used a cup-shaped base-piece 76 is secured in a suitable manner, as by headed screws 77, to the top of the rear portion of the base 1 of the machine. Closely fitting over the cup-like base 76 so as to be held in position by the friction between the outer surface of the said base and its own inner surface, is a hollow cylindrical casing 78, the top whereof is covered by a cap or cover 79. The latter is perforated to permit of the passage of the upper feed rod 75, which is guided by the sides of the said perforation. The base 76 has its bottom perforated to permit of the passage therethrough of the lower feed bar 80 which is bifurcated at its upper end, the arms 81 of the bifurcation embracing and guiding the lower end of the feed rod 75.

Suitably secured, as by rivets 82, to the upper portions of the arms 81, is a clutch holder 83 which is formed at one side with two upright ears 84, the latter being perforated to receive the short pivot rod 85. Pivoted on the rod 85 is the clutch member 86 which comprises a substantially horizontal gripping arm 87 and a tail portion 88 bent at right angles to the gripping arm and terminating in a rounded end 89. As best appears in Fig. 16, the upper portion of the cylindrical casing 78 is formed with two vertical slots 90 and 91 which are connected by a horizontal slot 92. In assembling the parts, the tail end 88 of the clutch member is introduced into the upper slot and then by turning the casing in the direction of the arrow in said Fig. 16, the tail end, passing through the horizontal slot 92, is introduced into the lower vertical slot 91 after which the pivot rod 85 is shoved into place. The gripping arm 87, as best appears in Fig. 14, has a central disk portion 93 which is perforated at 94 to permit the rod 75 to pass therethrough. As seen most clearly in Fig. 11, the upper edge of the right-hand side of the perforation 84 is rounded off, as is the lower edge of the left-hand side of said perforation. Suitably attached to the upper portion of the inner wall of the casing 78 at the left hand side is a friction spring 96 which is adjustable by means of a headed screw 97 which is screwed through the wall of the casing. A cylindrical cam sleeve 98 having its upper edge beveled at 99 surrounds the casing 78 and is vertically adjustable thereon by means of the slot 100 and screw 101.

In Fig. 13 the cam sleeve 98 is shown in lowered position where it will not affect the clutching or gripping member 86, the mechanism being set for "ordinary" spacing. Upon the depression of the finger key or of the spacing bar, the lower feed bar 80 is depressed in the same manner as has been hitherto described in connection with the lower feed bar 23. The sides of the perforation 94 gripping the upper feed rod 75 cause the latter to be lowered in unison with the feed bar 80. It is to be understood that the upper end of the feed rod 75 is connected with the dog members 27 and 32 in a manner similar to that hitherto described as applied to the upper feed bar 30, so that the loose dog 32 is disengaged from the escapement wheel 34 and the rigid dog is brought into the path of the same by the downward movement of the said feed rod 75. As soon as the upward movement of the finger key begins, the feed bar 80 begins to move upward and the end of the gripping arm 87 of the clutch member, which end is in contact with the friction spring 96, is so retarded by the said spring as to cause the gripping arm to be swung downwardly about its pivot until the gripping arm is substantially horizontal (as shown by the dotted lines in Fig. 13), whereupon the edges of the perforation 94 cease to clutch or grip the feed rod 75. Thus freed from the clutching member, the feed rod 75 is simultaneously disconnected from the feed bar 80 and is permitted to move upward and cause a letter space feed of the carriage in advance of the further upward movement of the finger key and the feed bar 80. During the upward movement of the feed bar 80 after the feed rod 75 has been disconnected from it, the end of the gripping arm 87 is swung about its pivot downward below the horizontal by the action of the spring 96, but the gripping arm in this position is prevented from gripping or clutching the feed rod 75 by reason of the fact that the contacting edges of the perforation 94 are rounded or cutaway as seen in Fig. 11, and as has been hitherto described. As the feed bar 80 nears the limit of upward movement, the top of the outer portion of the gripping bar 87 contacts with the top of the horizontal slot 92, so that when the normal position of the device is attained, the clutch member will have been swung about its pivot to the position shown in Fig. 11.

Considering now more especially Figs. 11 and 12, it will be noted that the cam sleeve 98 has been adjusted to effect the "reverse feed". The moving parts in this case move downward from the normal position shown in Fig. 11 until the rounded portion 89 of the tail of the clutch member contacts with the beveled edge 99 of the cam sleeve. Upon further downward movement the tail of the clutch member is cammed outwardly by the beveled edge 99 and rides down over the outside surface of the sleeve 98, bringing the arm 87 to a horizontal position and causing the feed rod 75 to be released before the completion of the key depression.

In Fig. 17 is illustrated a single clutch member similar to that shown in Fig. 11 except that removable gripping shoes 102 are mounted on tongues 103 formed on the gripping arm 104 of the clutch member. This construction increases the area of contacting surface and reduces the wear of the parts to a minimum.

In Fig. 18 is shown a single clutch member having a cam faced gripping arm 105 pivoted in the side of a carrier 106 which is operated in a manner similar to that of Figs. 1 to 10. The carriage in this instance, however, is formed, on the side opposite the cam, with projections 107 which abut against the side of the upper feed bar 30 so that when the arm 105 is in operative position the feed bar is gripped between the cam 105 and the projections 107.

I am aware that it is not broadly new to change an escapement mechanism which normally feeds the carriage during the return movement of the finger key so as to cause the mechanism to feed the carriage while the finger key is being depressed; or is it new to reverse the operation and change the escapement so as to cause the carriage to be fed a letter space during the return movement of the finger key instead of during the depression of the same. So far as I am aware, however, the contrivances hitherto devised for this purpose have all made use of the general principle of altering the character of the escapement mechanism either by modifying the characteristics of the escapement members, or else by employing an additional member, so as to change the relative positions of members performing particular functions. One type of escapement mechanism comprises essentially a feed dog, a holding dog and a rack, straight, segmental or circular. One form of this type or style of escapement is embodied in the machine illustrated in the drawings forming part of the specification. The method employed to change the feed with this form may, in general terms, be described as follows:—The loose or feed member or dog is, when the escapement is adjusted for the "ordinary" feed, normally in engagement with the escapement wheel or circular feed rack, which latter is continuously connected with the carriage during the letter spacing operation. When a key is depressed the feed dog is moved forward out of engagement with the rack and vibrated in feeding direction by its spring. At the same time the rear or holding member or dog is moved forward into engagement with the third member or rack. In this case the feeding movement of the carriage does not occur until, on the return movement of the dogs, the rear or holding dog disengages and the forward or feed dog reëngages with the third member or rack. To "reverse" the feed, various devices are employed to change the feed or loose dog into a holding or rigid dog, and to change the holding dog into a feed dog. This accomplished, the feed of the carriage takes place as soon as the forward dog, which is now the holding member, is drawn out of engagement with the third member or rack and the rear or, in this case, feed dog is drawn into engagement with the third member or rack.

Where the escapement members comprise two segmental, circular or straight racks and a single dog, devices of similar function are made use of to change the feed from "ordinary" to "reverse", and vice versa. In other words, the feed rack is fixed and the fixed rack is loosened to "reverse" the feed, and the operation is reversed to restore the feed to the "ordinary" form. In my invention, however, it will be noted that the relations of the escapement members or devices are not altered in changing from the "ordinary" feed to the "reverse feed", or vice versa. The feed member or dog or the "ordinary" feed is likewise the feed dog employed with the "reverse feed", and the holding member or dog employed with the "ordinary" feed is likewise the same holding dog that is employed with the "reverse feed" the relation between the two dogs being the same in both cases, and their relation with the third escapement member or rack remaining unaltered.

It is by providing means to automatically disconnect certain parts of the carriage feeding mechanism during the finger key movement, and by altering, relatively, the time at which this disconnection takes place that I effect the change of feed. The disconnection or separation of the parts is complete and as soon as it occurs the separated parts are free to move independently.

When an escapement mechanism of the "ordinary" style is employed, various devices have been resorted to in order to secure a quick release of the carriage from the escapement members after the impact of the type against the platen and immediately after the return movement of the key is begun. Some of these devices have made use of dog members which are frictionally connected with the dog rocker and are limited by stops so as to move with the dog rocker during only a part of its movement. Another method made use of to effect the same result is to frictionally mount upon the dog rocker a member which serves as a stop for one of the dogs, and this stop member is so limited as to participate only in part in the movement of the dog rocker.

By providing means to completely separate or disconnect certain of the escapement members from the universal bar, I secure a quick release without employing limiting means or stops, which latter are, so far as I am aware, essential to the devices hitherto employed to effect such release. This construction has an additional advantage where it is employed with type bar machines in which the universal bar contacts directly with key levers to which connecting wires are attached at varying distances from the center of motion of said key levers, as in the Remington typewriter. In machines of this class it is necessary to adjust separately each key lever in relation to the universal bar, in order that the escapement may take place when the type bars are at corresponding points in their paths of travel. By my construction such adjustment is unnecessary. Furthermore, it is possible to move the universal bar nearer the fulcrum of the key levers, as only motion sufficient to effect the release of the stepping dog is required. This would make the key action much easier.

As the mechanism herein set forth includes many features which are broadly new, I do not wish it to be considered that the invention is limited to the precise details of construction and arrangement described and shown, since many changes may be made without departing from the spirit of the invention. Some parts of the invention may be used without others. While I have shown the same as applied to a New Century Caligraph typewriting machine, it will, of course, be understood that it is applicable to other forms of writing machines.

What I claim as new and desire to secure by Letters Patent, is:—

1. In a typewriting machine, the combination of escapement members; a universal bar; means normally connecting said universal bar with certain of said escapement members; and means for automatically disconnecting said connecting means.

2. In a typewriting machine, the combination of escapement members; a universal bar; means for actuating said universal bar; means for connecting said universal bar with certain of said escapement members; and means for disconnecting said connecting means while the universal bar is being moved away from normal position.

3. In a typewriting machine, the combination of escapement members; a universal bar; means connecting said universal bar with certain of said escapement members; and means for automatically disconnecting said connecting means during movement of said connecting means away from normal position, said automatic disconnecting means being adjustable.

4. In a typewriting machine, the combination of escapement members; a universal bar; means for actuating said universal bar; means connecting said universal bar with certain of said escapement members; and means for automatically disconnecting said connecting means while the universal bar is being moved away from normal position, so that the disconnected parts are free to move independently, said automatic disconnecting means being adjustable.

5. In a typewriting machine, the combination of escapement members; a universal bar; a normally operative clutch; means connecting said universal bar with said clutch; means connecting certain of said escapement members with said clutch; and means for operating said clutch to disconnect said universal bar from said last named escapement members.

6. In a typewriting machine, the combination of escapement members; a universal bar; a clutch; means connecting said universal bar with said clutch; means connecting certain of said escapement members with said clutch; and means for operating said clutch to disconnect said universal bar from said last named escapement members, said operating means being adjustable.

7. In a typewriting machine, the combination of escapement members; a universal bar; a clutch; means connecting said universal bar with said clutch; means connecting certain of said escapement members with said clutch; means for operating said clutch to disconnect said universal bar from said last named escapement members; and means for operating said clutch to cause it to reconnect said universal bar with said escapement members.

8. In a typewriting machine, the combination of escapement members; a universal bar; a clutch; means connecting said universal bar with said clutch; means connecting certain of said escapement members with said clutch; means for operating said clutch to disconnect said universal bar from said last named escapement members, said operating means being adjustable to effect disconnection at any point; and means for operating said clutch to cause it to reconnect said universal bar with said last named escapement members.

9. In a typewriting machine, the combination of escapement members; a universal bar; a clutch; means connecting said universal bar with said clutch; means connecting certain of said escapement members with said clutch; adjustable means for operating said clutch to disconnect said universal bar from said last named escapement members; and adjustable means for operating said clutch so as to cause it to reconnect said universal bar with said last named escapement members.

10. In a typewriting machine, the combination of escapement members; a universal bar; a clutch; means connecting said universal bar with said clutch; means connecting certain of said escapement members with said clutch; and means for operating said clutch to alternately connect and disconnect said universal bar and said last named escapement members.

11. In a typewriting machine, the combination of escapement members; a universal bar; a clutch; means connecting said universal bar with said clutch; means connecting certain of said escapement members with said clutch; and means for operating said clutch to alternately connect and disconnect said universal bar and said last named escapement members, said operating means being adjustable.

12. In a typewriting machine, the combination of escapement members; a universal bar; means for causing said universal bar and certain of said escapement members to move in unison; and means for automatically disconnecting said universal bar from said last named escapement members.

13. In a typewriting machine, the combination of escapement members; a universal bar; means for causing said universal bar and certain of said escapement members to move in unison; and means for automatically disconnecting said universal bar from said last named escapement members, so that said bar and said members are free to move independently of each other, said automatic disconnecting means being adjustable to effect the disconnection at a predetermined point.

14. In a typewriting machine, a "reverse feed" escapement by which the carriage is fed during the depression of the finger keys, said escapement comprising a stepping or feeding member, a holding member, a third member with which said feeding member is normally engaged and from which said holding member is normally disengaged, and means for enabling the carriage to be fed during the depression of the finger keys when said feeding member is arranged so that it is normally engaged with said third member and said holding member is arranged so that it is normally disengaged from said third member.

15. In a typewriting machine, a "reverse feed" escapement by which the carriage is fed during the depression of the finger keys, said escapement comprising a stepping or feed dog, a holding dog, and a rack member, said feeding dog being normally engaged with said rack member, and said holding dog being normally disengaged from said rack member, and means for enabling the carriage to be fed during the depression of the finger keys when said contact member is arranged so that it is normally engaged with said rack member and said holding dog is arranged so that it is normally disengaged from said rack member.

16. In a typewriting machine, the combination of a carriage; escapement mechanism comprising a stepping or feeding member, a holding member, and a third member with which said feeding member is normally engaged; printing devices; finger keys for operating said printing devices and said escapement mechanism; and means for causing the feeding of the carriage in letter space direction during the depression of said finger keys.

17. In a typewriting machine, the combination of a carriage; escapement mechanism comprising a stepping or feeding member, a holding member, and a third member with which said feeding member is normally engaged; printing devices; finger keys for operating said printing devices and said escapement mechanism; and means for causing the feeding of the carriage in letter space direction, said means being adjustable to cause the carriage to feed at any desired point during the depression of the finger keys after said feeding escapement member has disengaged.

18. In a typewriting machine, the combination of a carriage; escapement mechanism comprising a stepping or feed dog, a holding dog and a rack member with which said feed dog is normally engaged and from which said holding dog is normally disengaged; printing devices; finger keys for operating said printing devices and said escapement mechanism; and means for causing the feeding of the carriage in letter space direction during the depression of said finger keys.

19. In a typewriting machine, the combination of a carriage; escapement mechanism comprising a stepping or feed dog, a holding dog and a rack member with which said feed dog is normally engaged and from which said holding dog is normally disengaged; printing devices; finger keys for operating said printing devices and said escapement mechanism; and means for causing the feeding of the carriage in letter space direction, said means being adjustable to cause the carriage to feed at any point during the depression of the finger keys after said feed dog has disengaged from said rack member.

20. In a typewriting machine, the combination of a carriage; a carriage feeding mechanism including an escapement continuously connected with said carriage during the letter spacing operation, a stepping or feeding escapement member normally engaged with said carriage-connected escapement member, and a holding escapement member; printing devices; finger keys for operating said printing devices and said carriage feeding mechanism; and means for causing the feeding of the carriage in letter space direction during the depression of said finger keys.

21. In a typewriting machine, the combination of a carriage; a carriage feeding mechanism including an escapement member continuously connected with said carriage during the letter spacing operation, a stepping or feeding escapement member normally engaged with said carriage-connected escapement member, and a holding escapement member; printing devices; finger keys for operating said printing devices and said carriage feeding mechanism; and means for causing the feeding of the carriage in letter space direction during the depression of said finger keys, said means being adjustable to cause the carriage to feed at any point after said feeding escapement member has disengaged.

22. In a typewriting machine, the combination of a carriage, a rack member continuously connected to said carriage during the letter spacing operation; a feed dog and a holding dog, said dogs being adapted to be moved into and out of engagement with said feed rack in a plane coincident with the plane of said rack member, said holding dog being normally disengaged from and said feed dog being normally engaged with said rack member; printing devices; finger keys for actuating said printing devices and said feed and holding dogs; and means for freeing said dogs from the control of said finger keys during the depression of the latter so as to permit the carriage to be fed during said depression.

23. In a typewriting machine, the combination of a carriage; a rack member continuously connected with said carriage during the letter-spacing operation; a feed dog and a holding dog, said dogs being adapted to be moved in a plane parallel to the plane of said rack member in order to effect the carriage feed; printing devices; finger keys for actuating said printing devices and said feed and holding dogs; and a clutch normally affording a connection between said finger keys and said feeding and holding dogs and operable to disconnect said keys and dogs during the depression of said finger keys so as to permit the carriage to be fed during said depression.

24. In a typewriting machine, the combination of a carriage, escapement members comprising a feed member, a holding member and a third member; printing devices; finger keys for operating said printing devices; a universal bar operative by said printing keys; means normally connecting said universal bar positively with said feeding and holding escapement members; and means for disconnecting said universal bar from said feeding and holding escapement members during the return movement of said finger keys.

25. In a typewriting machine, the combination of a carriage, escapement members comprising a feed member, a holding member and a third member; printing devices; finger keys for operating said printing devices; a universal bar operative by said printing keys; means normally connecting said universal bar positively with said feeding and holding escapement members; and means for disconnecting said universal bar during the return movement of the finger keys from said feeding and holding escapement members and while said holding escapement member is engaged with said third escapement member.

26. In a typewriting machine, the combination of a carriage, escapement members comprising a feeding member, a holding member, and a third member; printing devices; finger keys for operating said printing devices; a universal bar operative by said printing keys; means normally connecting said universal bar with said feeding and holding escapement members; and means for disconnecting said universal bar from said feeding and holding escapement members at the beginning of the return movement of said finger keys.

27. In a typewriting machine, the combination of a carriage; escapement devices; printing devices; finger keys for said printing devices; a universal bar; means normally connecting said universal bar with certain of said escapement devices; and means for disconnecting said universal bar from the escapement devices at the beginning of the return movement of the finger keys, thus permitting the carriage to feed at the beginning of the return movement of said finger keys and before the latter have returned to normal position.

28. In a typewriting machine, the combination of a carriage, escapement members comprising a feed dog, a holding dog and a rack member, the plane of movement of the three escapement members being coincident; printing devices; finger keys for operating said printing devices, means normally connecting said finger keys positively with said feeding and holding dog, and means for disconnecting said finger keys from said feeding and holding dogs at the beginning of the return movement of said finger keys.

29. In a typewriting machine, the combination of a carriage, escapement mechanism comprising a stepping or feeding member, a holding member, and a third member with which said feeding member is normally engaged; printing devices; finger keys for operating said printing devices and said escapement mechanism; means for causing the feeding of the carriage in letter space direction during the depression of said finger keys, and means independent of said holding and stepping or feeding members for so changing the feed as to cause the carriage to feed during the return movement of said finger keys, the functions and characteristics of the holding and stepping members being the same in either case, and their normal relation with said third member being the same in either case.

30. In a typewriting machine, the combination of a carriage, escapement mechanism comprising a stepping or feeding member, a holding member, and a third member with which said feeding member is normally engaged and from which said holding member is normally disengaged; printing devices; finger keys for operating said printing devices and said escapement mechanism; means for causing the feeding of the carriage in letter space direction during the depression of said finger keys, and means for so changing the feed as to cause the carriage to feed at the beginning of the return movement of said finger keys.

31. In a typewriting machine, the combination of a carriage; escapement mechanism comprising a stepping or feeding member, a holding member and a third member with which said feeding member is normally engaged and from which said holding member is normally disengaged; printing devices; finger keys for operating said printing devices and said escapement mechanism; means for causing the feeding of the carriage in letter space direction, said means being adjustable to cause the carriage to feed at any desired point during the depression of the finger keys after said feeding escapement member has disengaged, and means for so changing the feed as to cause the carriage to feed during the return movement of said finger key.

32. In a typewriting machine, the combination of a carriage; escapement mechanism comprising a stepping or feed dog, a holding dog and a rack member with which said feed dog is normally engaged and from which said holding member is normally disengaged; printing devices; finger keys for operating said printing devices and said escapement mechanism; means for causing the feeding of the carriage in letter space direction during the depression of said finger keys; and means for so changing the feed as to cause the carriage to fed during the return movement of said finger keys, the functions of the dogs remaining the same.

33. In a typewriting machine, the combination of a carriage; escapement mechanism comprising a stepping or feed dog; a holding dog and a rack member with which said feed dog is normally engaged and from which said holding member is normally disengaged; printing devices; finger keys for operating said printing devices in said escapement mechanism, means for causing the feeding of the carriage in letter space direction, said means being adjustable to cause the carriage to feed at any point during the depression of the finger keys after said feed dog has disengaged from said rack member; and means for so changing the feed as to cause the carriage to feed during the return movement of said finger keys, the functions of the dogs remaining the same.

34. In a typewriting machine, the combination with a carriage; a rack member continuously connected to said carriage during the letter space operation; a feed dog and a holding dog, said dogs being adapted to be moved in a plane parallel to the ane of said rack member in order to effect the carriage feed, the holding dog being normally disengaged from and the feed dog being normally engaged with said rack member; printing devices; finger keys for actuating said printing devices, and said feed and holding dogs; means for freeing said dogs from the control of said finger keys during the depression of the latter so as to permit the carriage to be fed during said depression; and means for so changing the feed as to cause said dogs to be freed from the control of said finger keys during the return movement of the latter so as to permit the carriage to be fed during said return movement.

35. In a typewriting machine, the combination of escapement members; a universal bar; a clutch frictionally mounted on the machine frame; means connecting said universal bar with said clutch; means connecting certain of said escapement members with said clutch; and means for operating said clutch to disconnect said universal bar from said last named escapement members.

36. In a typewriting machine, the combination of escapement members; a universal bar; an independent clutch carrier; a clutch mounted in said carrier; means connecting certain of said escapement members with said clutch; means for operating said clutch to disconnect said universal bar from said last named escapement members.

37. In a typewriting machine, the combination of escapement members; a universal bar; an independent clutch carrier frictionally mounted on the frame of the machine; clutch members pivoted to said clutch carrier, means connecting certain of said escapement members with said clutch members; means connecting said universal bar with said clutch members; and means for operating said clutch members to disconnect said universal bar from said last named escapement members.

38. In a typewriting machine, the combination of escapement members; a universal bar; stationary supports; an independent clutch carrier frictionally held between said supports, clutch members pivoted in said clutch carrier; means connecting said universal bar with said clutch members; means connecting certain of said escapement members with said clutch members; and means for operating said clutch members to disconnect said universal bar from said last named escapement members.

39. In a typewriting machine, the combination of escapement members; a universal bar; stationary supports; an independent clutch carrier frictionally held between said supports; clutch members pivoted in said clutch carrier; a lower bar connecting said clutch members with the universal bar; an upper bar connected with certain of said escapement members and normally held by said clutch members; and means for operating said clutch members to free said upper bar.

40. In a typewriting machine, the combination of escapement members; a universal bar; stationary supports; a clutch carrier guided between said supports; clutch members pivoted in said clutch carrier; a lower bar connecting said clutch members with the universal bar; an upper bar connected with certain of said escapement members and normally held by said clutch members; and a cam for operating said clutch members to free said upper bar.

41. In a typewriting machine, the combination of escapement members; a universal bar; stationary supports; a clutch carrier guided between said supports; clutch members pivoted in said clutch carrier; a lower bar connecting said clutch members with the universal bar; an upper bar connected with certain of said escapement members and normally held by said clutch members; and a cam for operating said clutch members to free said upper bar, said cam being adjustably mounted upon said stationary supports.

42. In a typewriting machine, the combination of escapement members; a universal bar; stationary supports; a clutch carrier guided between said supports; clutch members pivoted in said clutch carrier; a lower bar connecting said clutch members with the universal bar; an upper bar connected with certain of said escapement members and normally held by said clutch members; and a sleeve having a cam face adapted to operate said clutch members to free said upper bar.

43. In a typewriting machine, the combination of escapement members; a universal bar; stationary vertical track ways; a clutch carrier guided between said track-ways; clutch members pivoted in said clutch carrier; a lower bifurcated bar embracing said clutch members and connecting the same with the universal bar; an upper bar connected with certain of said escapement members and normally held by said clutch members; and a sleeve having a cam face adapted to operate said clutch members and free said upper bar, said sleeve surrounding said stationary support and being adjustable thereon.

44. In a typewriting machine, the combination of escapement members; a universal bar; stationary supports; a clutch carrier guided between said supports; clutch members pivoted in said clutch carrier; a lower bar connecting said clutch members with the universal bar; an upper bar connected with certain of said escapement members and normally held by said clutch members; means for operating said clutch members to free said upper bar; and means to reconnect said clutch members with said upper bar.

45. In a typewriting machine, the combination of escapement members; a universal bar; stationary supports; a clutch carrier guided between said supports; clutch members pivoted in said clutch carrier; a lower bifurcated bar embracing said clutch members and connecting the same with the universal bar; an upper bar connected with certain escapement members and normally held by said clutch members; means for operating said clutch members to free said upper bar; and means to reconnect said clutch members with said upper bar, said means being adjustably mounted upon said stationary supports.

46. In a typewriting machine, the combination with escapement members; a universal bar; vertical stationary trackways, a clutch carrier guided between said trackways, clutch members pivoted in said clutch carrier; a lower bifurcated bar embracing said clutch members and connecting the same with the universal bar; an upper bar connected with certain escapement members and normally held by said clutch members; an adjustable cam sleeve for operating said clutch members to free said upper bar; and adjustable screws mounted on said stationary trackways and adapted to actuate said clutch members to cause them to again grip said upper bar.

47. In a typewriting machine, the combination of printing keys; escapement members; a universal bar; and means adapted to connect said universal bar and certain of said escapement members normally and during movement of a printing key in one direction and to disconnect the connected parts during movement in the opposite direction.

48. In a typewriting machine, the combination of escapement members; a universal bar; and means adapted to connect certain of said escapement members with said universal bar normally and during the first half of their movement and which is adapted to disconnect the connected parts by the reversal of the direction of movement of said parts so that said parts are thereafter free to move independently.

49. In a typewriting machine, the combination of escapement members; a universal bar; and a clutch which is adapted to connect said universal bar and certain of said escapement members normally and during movement of the parts in one direction and to disconnect the connected parts by the reversal of the direction of movement.

50. In a typewriting machine, the combination of escapement members; a universal bar; an independent clutch carrier frictionally mounted on the frame of the machine; clutch members pivoted in said clutch carrier; a part connecting said clutch members with the universal bar; another part connected with certain of said escapement members and held by said clutch members during movement in one direction, said clutch members being adapted to release said part when the reverse movement is begun.

51. In a typewriting machine, the combination of escapement members; a universal bar; an independent clutch carrier frictionally mounted on the frame of the machine; clutch members pivoted in said clutch carrier; a part connecting said clutch members with the universal bar; another part connected with certain of said escapement members and held by said clutch members during movement in one direction, said clutch members being adapted to release said part when the reverse movement is begun, by reason of the fact that said clutch carrier remains stationary at the time of release.

52. In a typewriting machine, the combination of escapement members; a universal bar; stationary supports; an independent traveling carrier guided between said supports and adapted to be held between said supports by the friction generated by the spring of its size; clutch members pivoted in said clutch carrier; a bar connecting said clutch members with said universal bar; another bar connected with certain of said escapement members and held by said clutch members during the first half of their travel, said clutch members being adapted to release said last named bar and permit it to move independently by reason of the fact that the clutch carrier is held stationary by friction at the time of release.

53. In a typewriting machine, the combination of a carriage; escapement mechanism comprising a stepping or feed member, a holding member, and a third member with which said feed member is normally engaged; printing devices; finger keys for operating said printing devices and said escapement mechanism, said finger keys being constantly connected with said printing devices; and means for causing the feeding of the carriage in letter space direction, said means being adjustable to cause the carriage to feed at any desired point during the depression of a finger key after said feeding escapement member has disengaged.

54. In a typewriting machine, the combination of a carriage; escapement mechanism comprising a stepping or feed dog, a holding dog and a rack member with which said feed dog is normally engaged and from which said holding dog is normally disengaged; printing devices; finger keys for operating said printing devices and said escapement mechanism, said finger keys being constantly connected with said printing devices; and means for causing the feeding of the carriage in letter space direction during the depression of any of said finger keys.

55. In a typewriting machine, the combination of a carriage; escapement mechanism comprising a stepping or feed dog, a holding dog, and a rack member with which said feed dog is normally engaged and from which said holding dog is normally disengaged; printing devices; finger keys for operating said printing devices and said escapement mechanism, said finger keys being constantly connected with said printing devices; and means for causing the feeding of the carriage in letter space direction, said means being adjustable to cause the carriage to feed at any point during the depression of a finger key after said feed dog has disengaged from said rack member.

56. In a typewriting machine, the combination of a carriage; a carriage feeding mechanism including an escapement member continuously connected with said carriage during the letter spacing operation, a stepping or feeding escapement member normally engaged with said carriage connected escapement member, and a holding escapement member; printing devices; finger keys for operating said printing devices and said carriage feeding mechanism, said finger keys being constantly connected with said printing devices; and means for causing the feeding of the carriage in letter space direction during the depression of any of said finger keys.

57. In a typewriting machine, the combination of a carriage; a rack member continuously connected to said carriage during the letter spacing operation; a feed dog; a holding dog, said dogs being adapted to be moved in a plane parallel to the plane of said rack member in order to effect the carriage feed, said holding dog being normally disengaged from and said feed dog being normally engaged with said rack member; printing devices; finger keys for actuating said printing devices and said dogs, said finger keys being constantly connected with said printing devices; and means for freeing said dogs from the control of said finger keys during the depression of the latter so as to permit the carriage to be fed during said depression.

58. In a typewriting machine, the combination of a carriage; escapement members comprising a feed member, a holding member and a third member; printing devices; finger keys for operating said printing devices, said finger keys being constantly connected with said printing devices; means normally connecting said finger keys positively with said feeding and holding escapement members, and means for disconnecting said finger keys during their return movement from said feeding and holding escapement members.

59. In a typewriting machine, the combination of a carriage; escapement members comprising a feed member, a holding member and a third member; printing devices; finger keys constantly connected with said printing devices and adapted to operate the same; means normally connecting said finger keys positively with said feeding and holding escapement members; and means for disconnecting said finger keys during their return movement from said feeding and holding escapement members and while said holding escapement member is engaged with said third escapement member.

60. In a typewriting machine, the combination of a carriage; escapement members comprising a feeding member, a holding member and a third member; printing devices; finger keys constantly connected with said printing devices and adapted to operate the same; means normally connecting said finger keys positively with said feeding and holding escapement members; and means for disconnecting said finger keys at the beginning of their return movement from said feeding and holding escapement members.

61. In a typewriting machine, the combination of a carriage; escapement members comprising a feed dog; a holding dog and a rack member, the plane of movement of the three escapement members being coincident; printing devices; finger keys constantly connected with said printing devices and adapted to operate the same; means normally connecting said finger keys positively with said feeding and holding dog; and means for disconnecting said finger keys from said feeding and holding dogs at the beginning of the return movement of said finger keys.

62. In a typewriting machine, a mechanism for changing the carriage feed from the "ordinary" to the "reverse" feed and vice versa, comprising escapement members, and means adjustable independently of said escapement members for causing the carriage to feed either during the depression or during the return movement of the finger key, the functions and relative dispositions of all of said escapement members being the same for the "reverse" feed as for the "ordinary" feed.

63. In a typewriting machine, the combination of a power driven carriage; escapement devices therefor; printing devices; finger keys for operating said printing devices; a universal bar operative by said printing keys; positive connections between said universal bar and certain of said escapement devices; and means for breaking said connections during the operation of the printing keys.

64. In a typewriting machine, the combination of a power driven carriage; escapement devices therefor; printing devices; finger keys constantly connected with said printing devices and adapted to operate the same; and a universal bar operative by each of said finger keys and adapted to be intermittently connected positively with certain of said escapement devices during the operation of the machine.

65. In a typewriting machine, the combination of a carriage, an escapement member, a stepping dog always acting as such, a holding dog always acting as such, said dogs co-operating with and always normally bearing the same relation to each other and to said escapement member, and means for controlling the escapement to feed the carriage "ordinary" or "reverse" at will.

Signed at the borough of Manhattan, city of New York, in the county of New York and State of New York this 11th day of July, A. D. 1904.

HERBERT H. STEELE.

Witnesses:
    E. M. WELLS,
    M. F. HANNWEBER.